J. F. DAVIS.
MACHINE FOR RAISING AND CUTTING POTATO VINES AND THE LIKE.
APPLICATION FILED DEC. 1, 1919.

1,347,733.

Patented July 27, 1920.

INVENTOR.
James F. Davis
BY
ATTORNEY

UNITED STATES PATENT OFFICE.

JAMES F. DAVIS, OF ATWATER, CALIFORNIA, ASSIGNOR OF ONE-HALF TO SILAS S. HOWARD, OF ATWATER, CALIFORNIA.

MACHINE FOR RAISING AND CUTTING POTATO-VINES AND THE LIKE.

1,347,733.            Specification of Letters Patent.       Patented July 27, 1920.

Application filed December 1, 1919. Serial No. 341,628.

*To all whom it may concern:*

Be it known that I, JAMES F. DAVIS, a citizen of the United States, residing at Atwater, county of Merced, State of California, have invented certain new and useful Improvements in Machines for Raising and Cutting Potato-Vines and the like; and I do declare the following to be a full, clear, and exact description of the same, reference being had to the accompanying drawings, and to the characters of reference marked thereon, which form a part of this application.

This invention relates to improvements in agricultural implements, the principal object being to provide a device, which may either be power propelled or drawn by draft animals, by means of which potato and other vines may be raised from the ground, severed from the roots, and deposited to one side, all at one operation, with the forward movement of the machine.

I have particularly intended this machine to be used in connection with sweet potato vines, which are in reality of the climbing species, and consequently are quite long and lie all over the ground.

This fact makes it very hard to harvest the potatoes, and it has heretofore been the custom to first lift the vines and cut them by hand before attempting to dig the potatoes. This is obviously a slow procedure, and with the prevailing scarcity of farm labor, is apt to cause great delay in harvesting the crop.

The device may also be used to advantage for raising and cutting bean vines and similar vines and plants.

Another object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
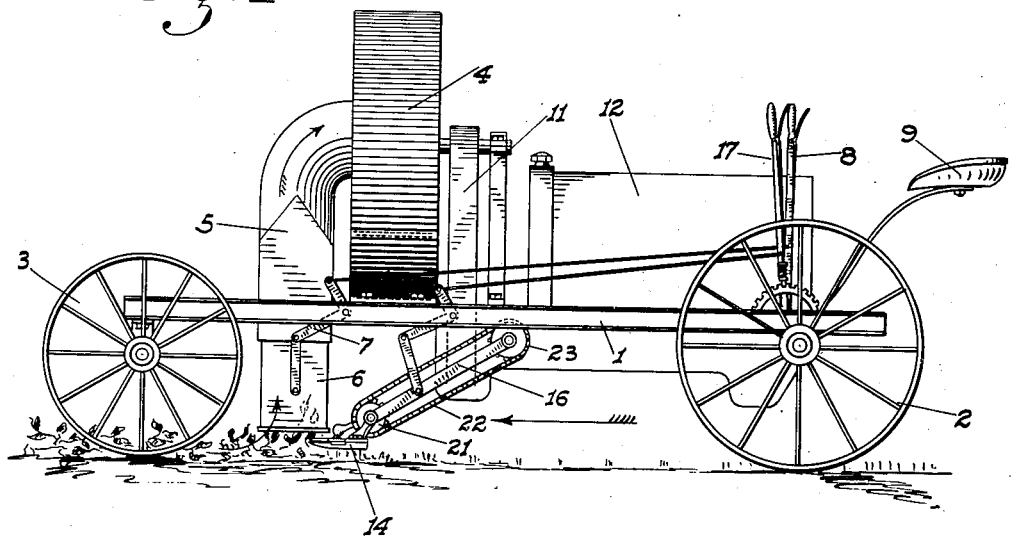
Figure 1 is a side elevation of a vehicle showing my improved raising and cutting device mounted thereon.
Figure 2:
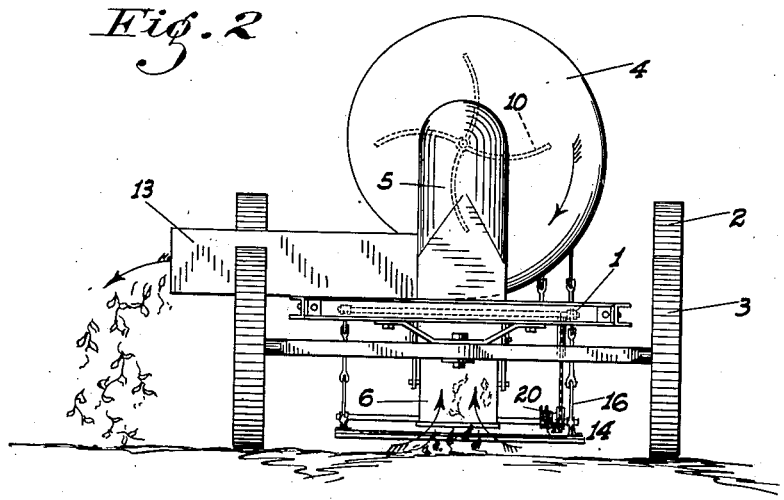
Fig. 2 is a front end elevation of the same.
Figure 3:
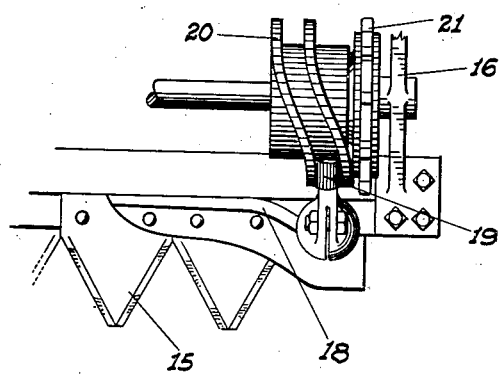
Fig. 3 is an enlarged fragmentary plan showing a sickle bar actuating means.

Referring now more particularly to the characters of reference on the drawings, the numeral 1 denotes a frame carried on rear wheels 2 and front wheels 3, which latter may be arranged to be turned to steer the machine. Mounted on the frame is a relatively large rotary suction fan 4, suitably inclosed and whose intake pipe 5 has a sleeve 6 slidable vertically therein, preferably rectangular; and adapted to reach nearly to the ground. The position of this sleeve relative to the ground may be adjusted and maintained in any position by suitable linkage 7 connected to an operating lever 8 positioned within convenient reach of the operator's seat 9. The rotor 10 of the fan is turned through the medium of a belt or chain drive mechanism 11 operatively connected with the shaft of a gas engine 12 or similar power plant mounted on the frame 1.

This engine may also be connected if desired to turn the wheels 3, in any of the many ways in which this may be done.

The discharge pipe 13 of the fan extends a certain distance to one side of the wheels, and both it and the intake pipe and sleeve are of sufficient size to receive and take a certain quantity of vines therethrough.

Positioned transversely of the frame 1 and situated just behind the sleeve 6 is a sickle 14, of the ordinary type as used in agricultural machinery, the teeth 15 thereof projecting horizontally into the area of the sleeve. This sickle is secured to pivoted arms 16, so that it may be raised out of the way for transportation, etc., or to cut higher when the sleeve 6 is also raised. This raising may be accomplished by means of a lever 17 suitably connected. In order to be able to operate the sickle from the engine regardless of its vertical position, to the pitman head 18 is secured a roller member 19, adapted to ride in the groove of an inclosed cam 20, designed to give the pitman the proper amount of transverse movement.

This cam is pivotally mounted to one of the arms 16 in conjunction with a sprocket wheel 21 from which a chain 22 leads to a similar wheel 23 mounted at the pivotal connection of the arm 16 with the frame 1, and arranged to be driven by the engine.

In operation, the power is applied to turn the fan, which action of course creates at least a partial vacuum therein. This causes the vines over which the sleeve 6 is moving to be drawn thereinto, and while so held in an upstanding position, are severed by the teeth of the sickle 14. The several vines are then passed through the fan, and ejected to one side of the machine through the discharge thereof.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:—

1. A machine for raising and cutting vines comprising a wheel mounted frame adapted for movement along the ground, a relatively large suction fan mounted on the frame, the intake thereof being positioned adjacent the ground, and a sickle operatively mounted behind the intake with the teeth projecting into the area thereof adjacent its lower edge.

2. A machine for raising and cutting vines comprising a wheel mounted frame adapted for movement along the ground, a relatively large suction fan mounted on the frame, the intake thereof being positioned adjacent the ground, a sickle operatively mounted behind the intake with the teeth projecting into the area thereof adjacent its lower edge, and means for independently adjusting the horizontal plane of the intake and sickle relative to the ground and to each other.

In testimony whereof I affix my signature in presence of a witness.

JAMES F. DAVIS.

Witness:
  BERNARD PRIVAT.